May 6, 1969  R. A. WELCH, SR  3,443,061
ELECTRIC SPACE HEATER
Filed Feb. 28, 1966

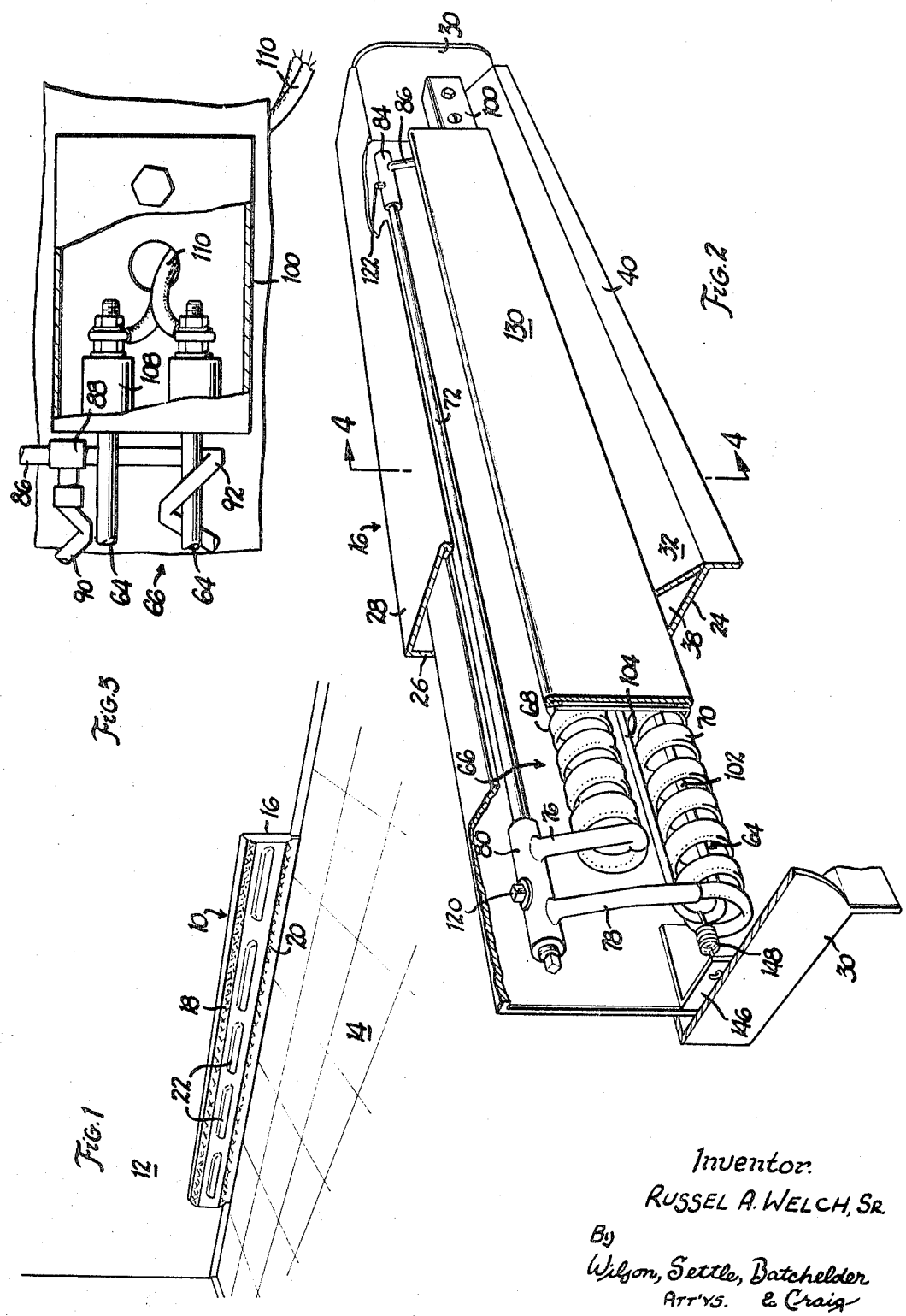

Inventor.
RUSSEL A. WELCH, SR.
By
Wilson, Settle, Batchelder,
ATT'YS. & Craig

May 6, 1969 R. A. WELCH, SR 3,443,061
ELECTRIC SPACE HEATER
Filed Feb. 28, 1966 Sheet 3 of 3

Inventor.
RUSSEL A. WELCH, SR.
By Wilson, Settle, Batchelder
ATT'YS. & Craig

United States Patent Office 3,443,061
Patented May 6, 1969

3,443,061
ELECTRIC SPACE HEATER
Russel A. Welch, Sr., St. Clair Shores, Mich., assignor of forty-five percent to Eugene A. Casaroll, Grosse Pointe, and five percent to Paul G. Hogue, Mount Clemens, Mich.
Filed Feb. 28, 1966, Ser. No. 530,499
Int. Cl. H05b 1/00; F24h 7/06
U.S. Cl. 219—365   11 Claims

ABSTRACT OF THE DISCLOSURE

A space heater having a pair of helical tubular liquid cells which are spaced laterally from each other and have opposite ends interconnected to produce parallel flow paths through the cells with a first heating element located in the convolutions of one cell and a second heating element located between the cells. A baffle protects at least part of the housing and in several embodiments the baffle forms the liquid connection between opposite ends of the liquid cells.

---

This invention relates to space heaters and more particularly to space heater units utilizing a radiant heating element and liquid cells wherein a portion of the radiant energy produced by the heating element is absorbed by the liquid cells and subsequently conveyed by convection to air flowing through the heater into the heated space.

It has previously been proposed to employ electric heaters which were operated partly by convection and partly by direct radiation into the space to be heated. Such heaters were controlled thermostatically to control the off and on phases of the heater cycle. When the temperature in the space being heated would rise to a predetermined comfort level the thermostat operated to place the heater on the off phase of the heater cycle which promptly discontinued producing heat until the heater was placed on the on phase of its cycle. Between the off and on phases of the heater cycle there was a so-called low spot in the temperature in the space heated resulting in discomfort to the occupants in said space.

The present invention overcomes the above problem by providing an electrical heater which heats substantially by convection and in which improved liquid sink arrangements are provided to continue heating between the off and on phases of the heater cycle to result in sustained comfort.

It is therefore an object of my invention to provide a liquid and electrical space heater unit wherein the radiant energy produced by an electrical heating element is partially absorbed in improved liquid cells to continue heating during the off phase of the cycle of the heating element and liquid cell means connect the outlets with the inlets of said improved liquid cells in convection fluid flow relation.

A further object of my invention is to provide an improved liquid cell arrangement formed of helical tubular construction.

A further object is to provide in a heater liquid cells to absorb some of the heat of an electrical heating element thereby reducing the temperature from the enclosing casing to permit operation of the heating element at a relatively high temperature.

A further object of my invention is to utilize in a space heater improved liquid cells formed of helical tubular construction with the convolutions of the cells being spaced apart and elongated in shape in horizontal cross section to diffuse heat laterally throughout the length of the cells when heat is applied thereto and into the interior of said convolutions to provide a uniform temperature of the air leaving said cells throughout the length thereof.

A further object of my invention is to provide in a space heater two liquid cells of helical tubular construction and heating means having a portion extending longitudinally through the convolutions of one of said cells and another portion in alignment with both cells and in heat exchange relation therewith and liquid cell means connects the outlets with the inlets of said two liquid cells in convection fluid flow relation.

Another object is to provide an improved arrangement in a space heater where two liquid cells of helical tubular construction are arranged in compact relationship with one cell being positioned directly over the other and a heating element is positioned in the convolutions of the lower cell and another portion of the heating element is positioned in the space between the cells and baffles are positioned at the rear and front of said cells to insulate the heating element from its enclosing casing and control the flow of air over said heating element and said cells.

Other objects of this invention will appear in the following description and appended claims, reference being had to the accompanying drawings forming a part of this specification wherein like reference characters designate corresponding parts in the several views.

In the drawings:

FIGURE 1 is a perspective view of one embodiment of the heater of the present invention mounted on a supporting wall surface;

FIGURE 2 is a perspective view of the heater with parts broken away for the purpose of clarity;

FIGURE 3 is an enlarged fragmentary view partly broken away and showing the right end of the heater shown and viewed in FIGURE 2;

Figure 4:
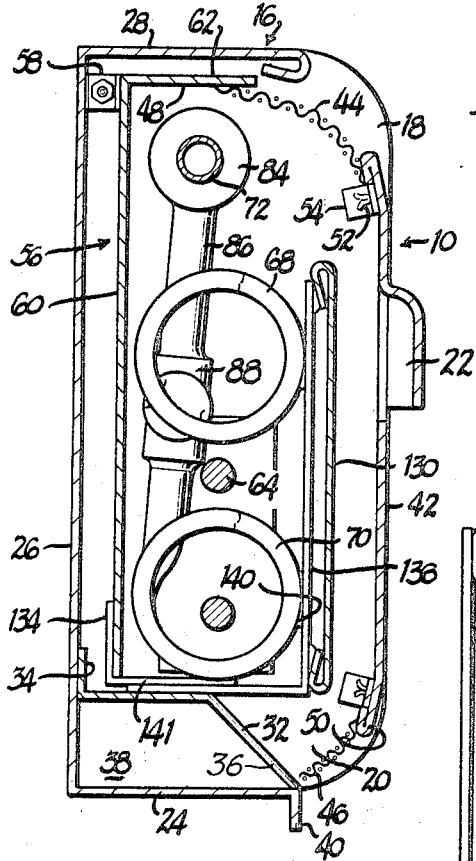
FIGURE 4 is a view taken along the line 4—4 of FIGURE 2 and looking in the direction of the arrows.
Figure 5:
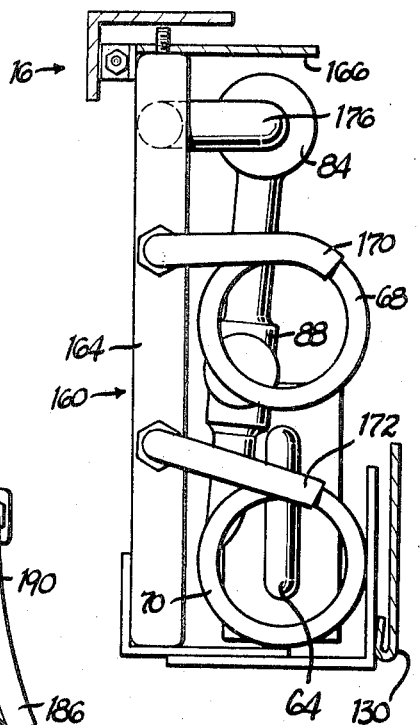
Figure 6:
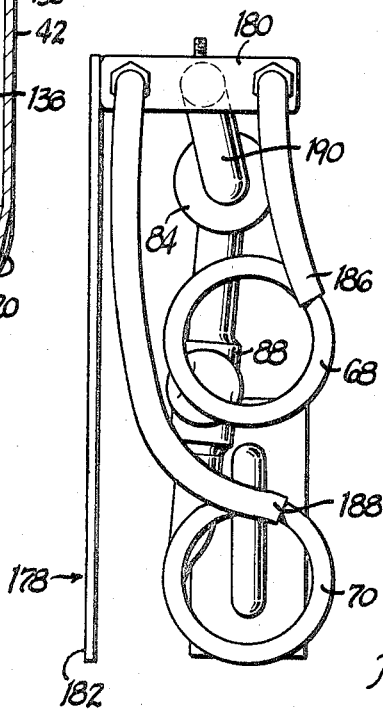
Figure 7:
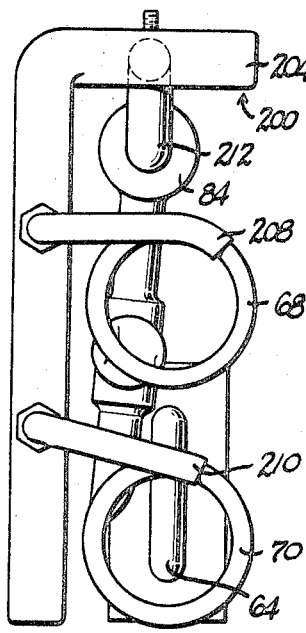
Figure 8:
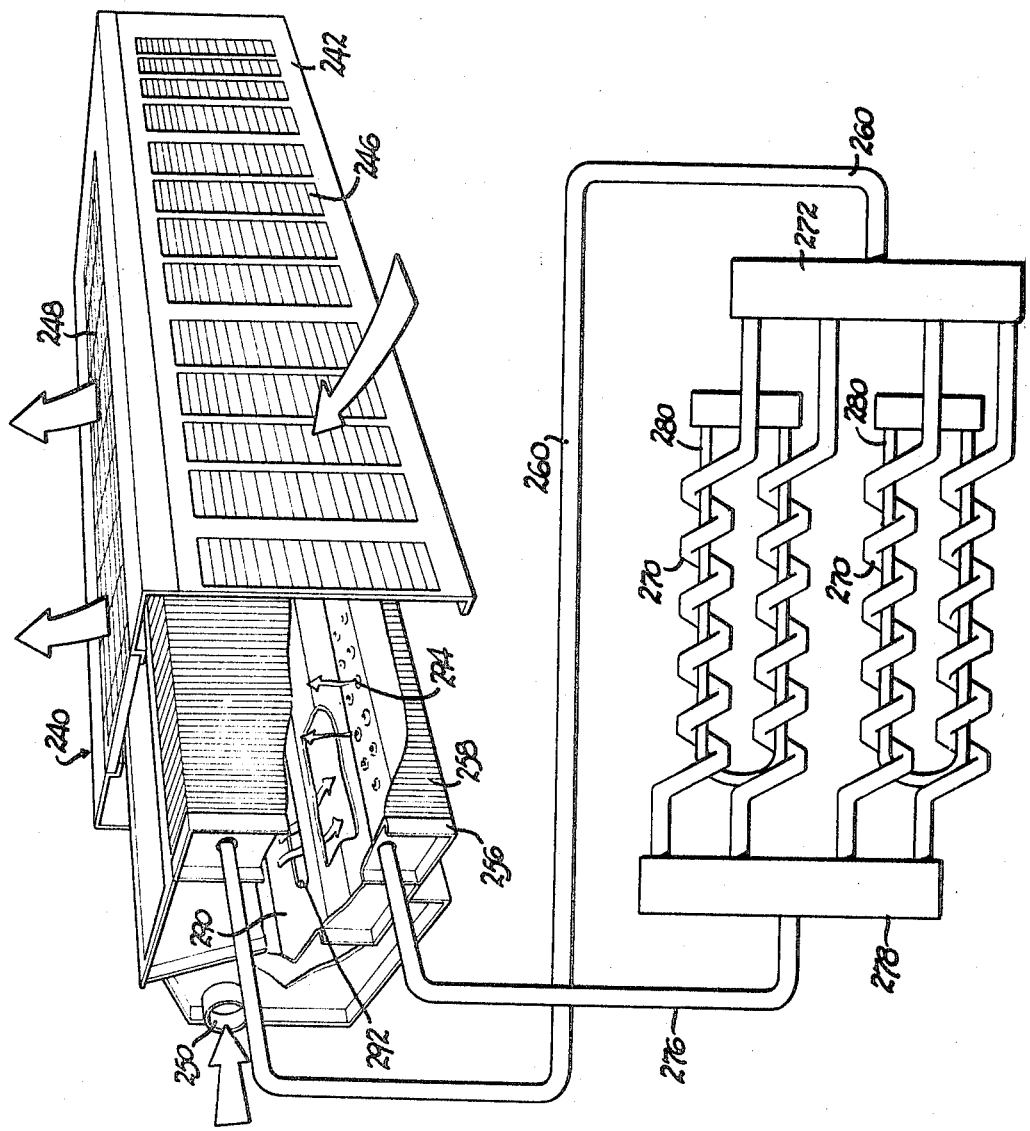

FIGURES 5, 6 and 7 are views similar to FIGURE 4 with L-shaped baffle having liquid cells formed in certain walls thereof. The heater units are each installed in the same housing as disclosed in FIGURE 4. FIGURE 5 shows such mounting and bracket support and the units shown in FIGURES 6 and 7 are mounted in such housing but omitted in these FIGURES 6 and 7 for the sake of clarity; and FIGURE 8 is a perspective view with parts broken away of a modified heater utilizing the heating cells embodying features of my invention and with air induction features.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURE 1, it will be noted that the heater 10 of the present invention is adapted for mounting on the wall 12 of a dwelling. The heater 10 is mounted only a short distance above the floor 14 so that heat from the unit will rise to heat the room. The heater unit includes an elongated housing 16 having an elongated upper opening 18, elongated lower opening 20 and spaced apart openings 22 intermediate the upper and lower openings for the circulation of air therethrough.

Referring to FIGURES 2 and 4 it will be noted that the housing 16, which is constructed of sheet metal has a generally rectangular cross section. The housing has a bottom wall 24, back wall 26 and top wall 28. The ends of the unit are closed by end walls 30.

An elongated plate 32 is provided within the housing and extends the length thereof. The plate 32 has one flange 34 which is secured to the back wall 26 and a down turned portion 36 which extends into abutment with the bottom wall 24. The bottom wall 24 and plate 32 define an elongated cavity 38. The cavity 38 may serve as an enclosure which acts to insulate the bottom of the heater from the floor. With respect to insulation, it will be noted that the front edge 40 of the bottom wall 24 is turned down. Thus the heater cannot be mounted directly on the floor but must be mounted in a manner spaced therefrom. The space between the heater and the floor also serves to insulate the heater from the floor.

A detachable front cover 42 completes the housing structure. The front cover defines, with the top wall 28 and bottom wall 24, the upper and lower openings 18, 20. Screen elements 44 and 46 are provided to guard the openings 18 and 20. The screen 44 is attached to a plate 62 of a baffle 56 along the edge 48. The lower screen 46 is attached to the front cover 42 along the edge 50.

As will be noted in FIGURE 4, the front cover 42 is provided with spring clips 52 which engage openings in brackets 54 mounted on the end walls 30 for detachable securement of the front cover to the housing 16.

As will be noted in FIGURE 4 the baffle 56 is L-shaped and is secured to the housing 16 by brackets 58 in spaced relation to the rear wall of the housing 16. The baffle 56 includes a vertically extending leg or plate 60 and a horizontally extending leg or plate 62. The baffle 56 serves to shield the back wall 26 against direct radiation of heat. The baffle 56 serves to mount an electrical heating element 64 and a liquid cell structure 66.

The liquid cell structure includes upper and lower cells 68 and 70 respectively. These cells are of helical tubular construction with the convolutions thereof being spaced apart on an angle and formed in elongated shape in horizontal cross section. By the use of "elongated shape" includes oval, oblong and eliptical in shape. The liquid cell structure 66 is shown in FIGURES 1 and 3 and also includes an upper liquid heat radiating member or crossover cell bar 72. The cell members 68 and 70 are connected to the member 72 by fittings 76 and 78 which are received in a manifold or fitting 80 on one end of the member 72 to connect the ends of the cells 68 and 70 in open communication with the member 72. The liquid cell structure includes a manifold or fitting 84 on the opposite end of the member 72 to which is connected a single conduit 86 having a T fitting 88 which connects the inlet ends 90 and 92 of the cells 68 and 70. This completes a convection fluid flow circuit through the liquid cell structure. The circuit includes the cells 68 and 70, fittings 76 and 78 at the outlets of cells 68 and 70, the manifold 80 which receives the fittings 76 and 78, crossover cell 72, manifold 84, conduit 86 and T connection 88. This connects the 68 and 70 cells in parallel convection fluid flow relation and it will be noted that the cells 68 and 70 are positioned in the housing 16 in parallel relationship.

The L-shaped baffle 56 is positioned behind the cells 68 and 70 and extends substantially from one end to the other of the housing 16. The cells 68 and 70 are positioned in the housing 16 with the cell 68 being directly over the cell 70. The heating element 64 is an electrical member of hairpin shape and is connected on the ends thereof to a guard box 100. One leg 102 of member 64 extends through the convolutions of cell 70 and the other leg 104 extends in the space between the cells 68 and 70. The heating element 64 is attached to the guard box 100 by fittings 108 which connect lead wires 110 to the heating element 64. Any suitable thermostat may be connected to the wires 110.

The manifolds 80 and 84 are provided with threaded plugs 120 and 122 respectively. The liquid cell structure 66 is substantially filled with a liquid, such as water. The cell structure 66 may be filled by removing plugs 120 and 122. The liquid is added at room temperature to a level sufficiently high that upon heating of the unit to operating temperatures, the liquid will expand and fill the cell bar 72. Upon expansion the liquid rises and drives out any air or excess liquid through the openings in the manifolds 80 and 84. Later the plugs 120 and 122 are replaced and when the heater 64 is de-energized, the liquid in structure 66 will cool and contract leaving a partial vacuum in the space above the liquid level. Subsequent reheating of the unit will cause expansion of the liquid to again fill the cell bar 72. By this arrangement there will be no gurgling or popping noises resulting from circulation of the liquid in the cell structure 66.

A front baffle 130 is positioned in front of the cell structure 66 and is arranged in a vertical position extending substantially from one end to the other of housing 16. The baffle 130 is secured to the baffle 56 by spaced apart L-shaped brackets 134 and 136. The brackets 136 rest on plate 32 and may be secured to cells 68 and 70 and brackets 134 by welding as at 140 and 141. The brackets 134 and 136 are narrow strips about 1″ in width and are equally spaced along the baffles 56 and 130 at four locations. As will be noted the baffle 56 extends downwardly substantially to plate 32. Thus the baffles 56 and 130 control the flow of air through the unit so that all air passing through the housing 16 flows in front of the baffle 56. The horizontal legs of brackets 134 are welded to cell 70.

The end of the heater 64 is secured to a plate 146 by a spring 148 to permit expansion and contraction without creating noises.

In operation of the invention, the heating element 64 is energized. Suitable thermostatic control means may be provided to control energization and de-energization of the heating element. The heating element 64 and liquid cell structure 66 are positioned between the baffles 56 and 130 and these baffles are spaced from the walls of the housing 16 so that very little heat is transmitted to the walls of the housing 16. Thus the front and rear portions of the housing are effectively shielded from heat radiation to thus run at a cool temperature.

When the heating element 64 begins to heat up, the surrounding air moves upwardly and out of the unit through the upper opening 18. At this time cooler air enters the lower opening 20. The heating element thus provides immediate comfort when it is energized. Air also enters opening 22 to mix with air passing between baffle 130 and cover 42 and the air above the baffle 130.

Radiation of heat from the heating element 64 into the cells 68 and 70 causes the liquid therein to be heated and the warm liquid rises to cause convection fluid flow circulation through the liquid cell structure 66. The flow of liquid through the structure 66 is through the outlets of the cells 68 and 70, through the fittings 76 and 78, manifold 80, cell bar 72, manifold 84, conduit 86 and T fitting 88 and into the inlets of cells 68 and 70. It will be noted that the fluid flow through the cells 68 and 70 is in parallel.

The flow of air through the housing 16 is by entering the lower opening 20, over the cells 68 and 70, heating element 64 and heat radiating cell bar 72 and out the upper opening 18. The horizontal leg 62 of the baffle 56 directs the heated air toward the opening 18. The flow of air over the cells 68 and 70 and cell bar 72 act to intercept radiation from the heating element 64 to thus shield the walls of the housing 16 as the volume of heat absorbed by the cells and cell bar is higher than that which may be absorbed by baffles 56 and 130. As a consequence of this arrangement, the heating element 64 may run at a higher temperature without overheating the walls of the housing.

A further advantage of the liquid cell structure 66 resides in that the cell structure acts as a liquid sink. When the heater is turned off because the temperature in the room being heated has risen to the desired point, the cell structure continues to provide heat for a period of time. As a result, the heating element 64 need not be energized as frequently as is the case when a heat sink is not provided.

The units shown in FIGURES 5, 6 and 7 are similar to the unit shown in FIGURES 2, 3 and 4 with the exception that the crossover cell bar 72 and manifold 80 of FIGURE 2 are omitted and the L-shaped baffles of FIGURES 5, 6 and 7 substituted therefor. The units shown in FIGURES 5, 6 and 7 are enclosed in housing 16 and support the bracket 130 the same as the unit in FIGURE 4.

FIGURE 5 discloses an L-shaped baffle arrangement 160 which is enclosed in housing 16 and supports bracket 130 and cells 68 and 70, heating element 64, manifold 84 and T connection 88 the same as in FIGURE 4. The L-shaped baffle arrangement 160 includes a vertical leg 164 which forms a liquid heat radiating cell and a horizontal leg 166 at the top thereof. This leg 164 extends substantially throughout the length of the housing for circulating heated liquid. The leg 164 is connected to the outlets of cells 68 and 70 by fittings 170 and 172 respectively. The leg 164 is connected at its other end to manifold 84 by fitting 176. This completes the fluid flow circuit for circulating heated liquid in convection fluid flow relation. The cells 68, 70 and cell 164 absorb heat from the heater 64 when it is energized and give off heat when the heater is de-energized the same as structure 66.

FIGURE 6 is like FIGURE 5 except that the L-shaped arrangement 178 includes a top horizontal leg which forms a liquid cell 180 and a vertical leg 182. The outlets of cells 68 and 70 are connected to cell 180 by fittings 186 and 188 respectively and the manifold 84 is connected to the opposite end of the cell 180 by fitting 190. This unit 178 with baffle 130 is arranged to be enclosed in housing 16 the same as units 66 and 160 in FIGURES 1 and 5.

FIGURE 7 is like FIGURES 5 and 6 except that the L-shaped arrangement 200 includes a liquid cell 204 formed by both the horizontal and vertical legs thereof. The outlets of cells 68 and 70 are connected to cell 200 by fittings 208 and 210 respectively and the opposite end of cell 200 is connected to manifold 84 by a fitting 212. This unit 200 with baffle 130 is arranged to be enclosed in housing 16, the same as units 66, 160 and 178.

FIGURE 8 discloses an air induction unit in combination with my liquid cell structure. The unit 240 includes a housing 242 having air inlets 246 in the front thereof and air outlets 248 at the top thereof. The housing also includes an air inlet 250 and an outlet (not shown) at the opposite end thereof. A liquid cell or heating coil 256 is positioned adjacent the inlets 246 and is of sinuous or serpentine formation with fins 258. Any desired number of runs may be used in coil 256. The coil 256 is connected on its inlet end by conduit 260 which connects the outlet ends of four helical liquid cells 270 by manifold 272. The cells are formed the same as cells 68 and 70 of FIGURE 1. The outlet of coil 256 is connected to the inlets of cells 270 by conduit 276 and manifold 278. Hairpin electric heaters 280 extend through the convolutions of the cells 270 with one heater having one leg in one cell and the other leg in a second cell. The other heater is likewise arranged in the other two cells. The cells 270 are heated the same as cell 68 and 70 and the liquid is circulated therethrough in parallel fluid flow relation due to the coil 256 and conduits 260 and 276.

Air flows through the openings 242 and over the coil 256 and out the openings 248. This part of the heating arrangement may be used the year around by thermostatic control of the heating elements 280 or it may be used at various times to take the chill out of the space to be heated when the air induction unit is not in operation. The cells 270 may be located anywhere and may be enclosed in an insulated casing (not shown).

The air induction feature includes receiving air at high velocity in inlet 250 where it enters chamber 290 and then the air passes through slot 292 and up through jets 294 at the rear of coil 256 to induce the flow of air through inlets 246 and over the coil 256. The air received in inlet 250 is conditioned heated primary air and the air entering the openings 246 is secondary air and the two mix before passing through the openings 248 into the room. The air entering the opening 250 is from a central source and that part of the entering air which does not pass through the slot 292 passes out an opening at the opposite end of the housing to a second unit where multiple units are used or it returns to its source. The air induction feature and the cells 270 may be operated concurrently or independent of each other.

Having thus described my invention,
I claim:

1. A space heater comprising first elongated liquid cell, a second elongated liquid cell disposed adjacent and spaced laterally of said first cell, each cell being of helical tubular construction and having inlet and outlet openings at opposite ends thereof, heating means including first and second elements respectively positioned in the convolutions of one of said liquid cells and between said liquid cells, and liquid cell means connecting the outlets of said liquid cells with the inlets thereof in convection fluid flow relation.

2. A space heater as defined in claim 1, further characterized by said heating means comprising an electrical hairpin shaped heater defining said first and second elements.

3. A space heater as defined in claim 1, further characterized by said second cell positioned directly above said first cell with said first element positioned in the convolutions of said first cell.

4. A space heater as defined in claim 1 and further characterized in that the convolutions of the liquid cells of the helical tubular construction are of elongated shape in horizontal cross section and are spaced from each other with the widest portions of the elongated shaped convolutions of each cell facing the heating means to diffuse heated air laterally upon passing into said convolutions to provide a uniform temperature of the air leaving said cells throughout the length thereof.

5. A space heater as defined in claim 1 and further characterized in that the liquid cell means includes a liquid radiating member receiving the adjacent ends of said first and second liquid cells at one end thereof in open commouncation with each other to conduct heated liquid to a single liquid conduit received in the opposite end of said member and having a T connection which connects the opposite ends of said first and second liquid cells to provide convection fluid flow relation for the circulation of liquid through said first and second liquid cells in parallel relation.

6. A space heater as defined in claim 1 wherein the first and second liquid cells are positioned in parallel relation and the liquid cell means connect said first and second liquid cells in parallel convection fluid flow relation.

7. In a space heater, the combination of an elongated housing having an air inlet and an air outlet, first and second elongated liquid cells disposed longitudinally within said housing, said cells being transversely spaced above each other and having fluid inlet and fluid outlet openings at opposite ends thereof, heating means positioned in alignment with said cells to radiate heat thereto, a third elongated liquid cell connecting the fluid outlets of the first and second cells with the inlets thereof in convection fluid flow relation for the circulation of liquid through said first and second liquid cells along parallel flow paths between said inlets and said outlets, and a baffle forming at least part of said third cell and extending longitudinally along one side of said first and second cells to separate at least a portion of said housing from said first and second cells.

8. A space heater as defined in claim 7 wherein said baffle is L-shaped with the horizontal leg of said baffle forming the third liquid cell which connects the outlets with the inlets of said first and second liquid cells in convection fluid flow relation.

9. A space heater as defined in claim 7 wherein said baffle is L-shaped with the vertical leg of said baffle forming the third liquid cell which connects the outlets with the inlets of said first and second liquid cells in convection fluid flow relation.

10. A space heater as defined in claim 7 wherein said baffle is L-shaped with both legs forming the third liquid cell which connects the outlets with the inlets of said first and second liquid cells in convection fluid flow relation.

11. A space heater as defined in claim 7 and wherein said first and second cells are of helical tubular construction defining convolutions, further characterized in that the heating means include an element extending longitudinally through the convolutions of one of said liquid cells and a second element in heat exchange relation with the other liquid cell, said baffle comprises an L-shaped member with the horizontal leg of said member defining said third liquid cell and positioned in said housing over said first and second liquid cells for radiating heat to air passing thereover and further characterized in that the vertical leg of said L-shaped baffle is positioned along the rear side of said first and second liquid cells and a second baffle positioned along the front side of the first and second liquid cells so that the two baffles control the air flow movement through the housing over said first, second and third liquid cells.

References Cited

UNITED STATES PATENTS

| | | | |
|---|---|---|---|
| 869,464 | 10/1907 | Stevens | 219—304 |
| 1,225,631 | 5/1917 | Hinkle | 219—304 |
| 1,393,531 | 10/1921 | Howard | 219—365 |
| 1,673,567 | 6/1928 | Hynes | 219—303 X |
| 1,678,059 | 7/1928 | D'Ardenne | 219—369 X |
| 1,875,844 | 9/1932 | Braunagel | 219—304 X |
| 1,969,282 | 8/1934 | Szikla et al. | 219—366 X |
| 2,000,478 | 5/1935 | Conte | 219—303 |
| 2,427,476 | 9/1947 | Schick | 219—341 X |
| 2,435,101 | 1/1948 | Reich | 219—304 X |
| 3,253,123 | 5/1966 | Welch | 219—365 |

ANTHONY BARTIS, *Primary Examiner.*

U.S. Cl. X.R.

126—101; 165—55, 106; 219—304, 341, 368, 369; 237—16